(12) United States Patent
Salser et al.

(10) Patent No.: US 9,891,089 B2
(45) Date of Patent: Feb. 13, 2018

(54) MODULAR FLUID METER TEST BENCH

(71) Applicant: OW Investors, LLC., Ocala, FL (US)

(72) Inventors: Floyd Stanley Salser, Ocala, FL (US);
Michael Louis Mastic, Ocala, FL (US);
David Allen Zook, Ocala, FL (US);
Andrew Douglas Jenkinson, Belleview, FL (US)

( * ) Notice: Subject to any disclaimer, the term of this patent is extended or adjusted under 35 U.S.C. 154(b) by 0 days.

(21) Appl. No.: 15/179,716

(22) Filed: Jun. 10, 2016

(65) Prior Publication Data
US 2016/0349100 A1 Dec. 1, 2016

Related U.S. Application Data

(63) Continuation-in-part of application No. 29/559,780, filed on Mar. 31, 2016, now Pat. No. Des. 788,272, which is a continuation-in-part of application No. 29/526,717, filed on May 13, 2015, now Pat. No. Des. 767,104, which is a continuation-in-part of application No. 29/480,517, filed on Jan. 27, 2014, now Pat. No. Des. 755,939, application No. 15/179,716, which is a continuation-in-part of application No. 14/253,824, filed on Apr. 15, 2014, now Pat. No. 9,702,751, which is a continuation-in-part of application No. 29/480,517.

(60) Provisional application No. 61/811,830, filed on Apr. 15, 2013, provisional application No. 62/173,861, filed on Jun. 10, 2015.

(51) Int. Cl.
*B25H 1/02* (2006.01)
*G01F 15/18* (2006.01)
*G01F 25/00* (2006.01)
*B25F 1/02* (2006.01)

(52) U.S. Cl.
CPC .......... *G01F 15/18* (2013.01); *G01F 25/0038* (2013.01); *B25F 1/02* (2013.01)

(58) Field of Classification Search
CPC .......... A47B 87/002; B25H 1/02; B25H 1/04; G01F 25/0092; G01F 15/18; G01F 25/0038
See application file for complete search history.

(56) References Cited

U.S. PATENT DOCUMENTS 4,502,318 A * 3/1985 Converse ............ G01F 25/0007
                                                73/1.25
4,823,592 A * 4/1989 Hahn ........................ G01F 1/84
                                                73/1.33
(Continued)

FOREIGN PATENT DOCUMENTS

GB            2527181 A   * 12/2015
KR      1019930018261 A   *  9/1993
(Continued)

*Primary Examiner* — David A Rogers
(74) *Attorney, Agent, or Firm* — Monty Simmons; Simmons Patents

(57) ABSTRACT

The disclosed invention is a modular fluid meter test system configured for testing the accuracy of fluid flow meters. The modular test system is configured with an input module, an output module and zero or more center modules. The system is configured to be shipped disassembled so that it can be installed inside a test facility without the need to modify the entrances of the structure to house the test system.

17 Claims, 23 Drawing Sheets

(56) References Cited

U.S. PATENT DOCUMENTS

| | | | | |
|---|---|---|---|---|
| 4,859,953 A | * | 8/1989 | Young | G01R 31/02 324/539 |
| 5,678,706 A | * | 10/1997 | Husak | A47B 47/005 211/189 |
| 7,584,644 B2 | * | 9/2009 | Lamontagne | G01F 25/0092 73/1.74 |
| 7,802,462 B2 | * | 9/2010 | Standiford | G01F 25/0046 73/1.16 |
| 9,138,074 B2 | * | 9/2015 | Arne | A47F 3/005 |
| 9,713,377 B2 | * | 7/2017 | Arne | A47F 3/063 |
| 9,750,344 B2 | * | 9/2017 | Gammon | A47B 87/002 |
| 2007/0214863 A1 | * | 9/2007 | Lamontagne | G01F 25/0092 73/1.16 |
| 2008/0202197 A1 | * | 8/2008 | Standiford | G01F 25/0046 73/1.33 |
| 2011/0316396 A1 | * | 12/2011 | Arne | A47F 3/005 312/107 |
| 2014/0239136 A1 | * | 8/2014 | Ortega | A47B 13/06 248/165 |
| 2017/0173779 A1 | * | 6/2017 | Luis y Prado | B25H 1/14 |

FOREIGN PATENT DOCUMENTS

| | | | | |
|---|---|---|---|---|
| KR | 1019950001869 B1 | * | 3/1995 | G01N 33/28 |
| KR | 1019950003624 B1 | * | 4/1995 | |
| KR | 1020100113806 A | * | 10/2010 | |
| PL | 338756 A1 | * | 8/2000 | |

* cited by examiner

MODULAR FLUID METER TEST BENCH

CLAIM TO PRIORITY

This application claims the benefit of provisional application 62/173,861 filed on 10 Jun. 2015 and is further a continuation in part to pending design patent application Ser. No. 29/559,7809, filed on 31 Mar. 2016, and claiming priority to pending design patent application Ser. No. 29/526,717, filed on 13 May 2015 which is a continuation in part of design patent application Ser. No. 29/480,517, filed on 27 Jan. 2014, and Utility patent application Ser. No. 14/253,824, filed on 15 Apr. 2014 claiming the benefit of provisional application 61/811,830 filed on 15 Apr. 2013, of which the entire contents of all such references are incorporated herein by this reference for all that they disclose for all purposes.

TECHNICAL FIELD

The inventions disclosed herein relate to the new and novel ornamental and utilitarian features for a test system configured for testing the accuracy of fluid flow meters.

BACKGROUND

There are many different types of water meters, including positive displacement, multi-jet, nutating disc, sound based systems (e.g. ultrasonic) and the fluidic oscillator, just to name a few, all using different principles to measure fluid flow. Notably, meter accuracy will vary between meters, even meters of the exact same make and type. In fact, a particular meter may be inherently better at measuring higher flows compared to lower flows. Consequently, flow meters are tested to verify their accuracy at various flow rates.

Although vastly different technologies can be used to measure fluid flow, the principles/processes used to test their accuracy are the same: run a known volume (i.e. the "actual volume") of water through one or more meters and compare such test meter's indicated flow volume to the actual volume. If the meter under test provides measured volume readings within an acceptable deviation from the actual volume, then the meter is working correctly.

For testing fluid meters, the fundamental task is to provide a test system that (i) generates the desired fluid flow (that flows through the meters being tested), (ii) at the desired flow rate, and (iii) determines the "actual volume" value where such value is used to compare to the measured volume values generated by the meters being tested. Such is likely a much more complex task than one might appreciate and the technology disclosed herein relates to such a test system.

The most widely used and probably the most popular method for testing flow meters is called the volumetric system. The volumetric system can be compared to a measuring cup—one puts a substance in the cup which has a scale that indicates volume. For a fluid meter test system, a fluid is pumped through meters under test and into a calibrated fluid tank where volume values are marked at different levels along the side of the tank (or some similar method), and the fluid level is viewed through a sight tube. The corresponding volume in the calibrated fluid tank is then compared to the volumes recorded by the meters. Thus, if the fluid tank indicates, for example, there is 20.36 gallons of water in the tank a meter being tested should indicated 20.36 gallons of water has flowed through the meter.

It is very difficult, however, to achieve the level of accuracy needed (for testing purposes) to determine the "actual value" of fluid volume by reading the level of a fluid against a measuring stick (basically). Thus, very accurate systems use an additional property of the fluid to determine its volume: weight.

The gravimetric test system further measures the weight of the fluid in the calibrated fluid tank. The increase of the weight of the calibrated fluid tank holding the fluid pumped through the meters under test is proportional to the amount of fluid pumped into the tank. Before the test the tank is empty and weights X. After the test the tank contains the fluid pumped through the meters under test and such tank and fluid weights (X+W) where "W" is the weight of such fluid. Thus, the "actual volume" value would be determined, at least in part, using weight "W".

One of the oldest and most respected manufacturers and pioneers of prior art fluid meter test bench technologies is MARS® Company. MARS® is the domestic and international leader in water meter testing and technology services. An exemplary MARS® small meter prior art gravimetric test system will test a plurality of meters during one test (say 20, although the number can vary per customer requirements) where the input of the first meter is connected to the test system fluid source. The meters are placed in series so that the output of one meter is connected to the input of the next meter and so on down the line until the output of the last meter is associated with the measuring tank. This allows a plurality of meters to be tested simultaneously thereby saving time.

Thus, a typical prior art gravimetric test system is made up of the following components:

Test Bench: The actual device on which meters to be tested are secured;

Carrier Bars: The device(s) on the bench that holds the meters in place (carry) allowing them to slide/move to form a fluid tight seal (without the need for bolts) when a clamping device pushes them together;

Test Spools: Varying lengths and diameters of pipe spools used as spacers and transition pieces between meters under test;

Meter Adaptors: Meters come in various sizes and are typically threaded on the input and output (of various sizes/diameters) so that fluid pipes can be associated with the meter. Adapters allow for the positioning of threaded meter inputs in the test system without the need for a threaded connector and can also provide for the quick transition from one-meter size to the next;

Motion Operator: The device on the test bench which causes the clamping force that pushes the meters and associated valves and spools together to form a water tight transition from meter to meter without using bolts—just a clamping pressure;

Electric Actuator: The part of the motion operator that moves the device;

Measurement Tanks: Tanks into which the fluid forced through the meters under test during testing is directed for measuring volume via a measuring "stick" and/or scales;

Scales: The physical hardware on which the measurement tanks sit that measures the weight of the tank and any fluid in the tank;

Control Valves: A system of valves that direct the fluid throughout the different cycles of testing;

Control Console: The testing interface which houses the control wiring, computer, and the scale interface hardware (to communicate automatically with the scales);

Controller: The measurement system used to measure volume and serve as an operator interface for the computerized and manually controlled tests;

Software: The computer code used in conjunction with the Controller to control and document the tests as well as provide an inventory database; and Roto Meters: Quick reference flow meters allowing the technician to set an approximate flow rate (to within + or −2%) while running a test.

While MARS'® test bench technologies have enjoyed a phenomenally long track record of success, recent growth and anticipated future developments are expected to require novel and unique changes in such technologies to provide the best solutions for the future global market. MARS'® solution is to move to a modular test bench design.

One issued solved by a modular design relates to size. Prior art gravimeter systems comprise large fully welded one piece frames that will not fit into many buildings/rooms with small doors. It may be necessary, for example, to knock out walls, install the system, and then repair the damage. Further, not only is it often difficult to maneuver such systems into a building it may be equally difficult or not economically feasible to maneuver within a building and make "turns" within the building to reach a desired installation area. Additionally, while these test bench systems are not intended to be moved, and are not moved very often, if moving the testing system is required, one must once again knock out walls and doorways may need to be altered to create the room needed to move the test bench system. A more modular design solves this issue.

Another benefit of a modular design relates to upgrading the testing capability of a system. If designed correctly, test bench sections can be similar to "building blocks" where one simply orders and installs another "building block" to increase the size and testing capability of the test bench. Such is very difficult and generally economically prohibited for prior art systems.

Yet another benefit of the modular design relates to achieving a non-straight-line configuration. Rooms generally have a square footprint and are not narrow like hallways. Thus, there will likely be "extra" room on the sides of a test bench system. The modular design makes adding a second line of testing positions relatively simple and/or defining an "L" shaped test bench more simple.

Another somewhat unexpected benefit with modular designs is that a modular design allows for the development of an easier process for describing, ordering, manufacturing, shipping, installing and upgrading a test system. Everything we do, we do by "process". Even when we use no process such is actually just a random process (the process is to have no process). A Random Process typically yields random results. The key to consistent results is process management—Establishing well defined processes and then following them. The better the process the more consistent the results. If something goes wrong, determine the cause and simply tweak the process to eliminate the cause of the error. Over time the process tends to become fool proof.

Process management works with any activity including ordering, manufacturing, shipping, installing and using a test bench. A more modular test bench system allows for the development of a more focused process for each activity. Such processes will provide more repeatable, accurate results for the market (which has varying construction and electrical requirements).

The transition from an integrated test bench to a more modular system while maintaining measurement accuracy is likely more challenging than one expects. There are design problems/opportunities with a modular test bench system that must be addressed.

First, the structural integrity between the individual modules should be sufficiently strong so as not to materially affect the measuring accuracy of the test system during high pressure testing (for one example). Second, the alignment of the various sections must meet minimum standards to not adversely affect the measuring accuracy. Third, the various sections need to meet minimum leveling requirements so as not to adversely affect the measuring accuracy. Thus, a modular system has structural integrity, alignment, and leveling issues to address that are not present in prior art one-piece systems.

The disclosed inventions address at least the above described design opportunities related to the transition from an integral frame test system to a more modular system.

DISCLOSURE OF THE INVENTION

Some of the objects and advantages of the invention will now be set forth in the following description, while other objects and advantages of the invention may be obvious from the description, or may be learned through practice of the invention.

Broadly speaking, a principle object of the present invention is to provide a more modular apparatus and method, with associated ornamental features, configured for testing the accuracy of fluid meters.

Yet another general object of the invention is to provide a more modular apparatus and method, with associated ornamental features, configured for testing the accuracy of fluid meters where such modular system provides the structural integrity and alignment features necessary to provide accurate test results.

Another general object of the invention is to provide a more modular apparatus and method, with associated ornamental features, configured for testing the accuracy of fluid meters and further configured for shipping at least partially disassembled where the system components can be easily transported through a standard door size and be assembled on site by nonprofessional installers and where such system will provide accurate test results once assembled.

Another general object of the invention is to provide a more modular apparatus and method, with associated ornamental features, configured for testing the accuracy of fluid meters and further configured so that additional testing capability is achieved by simply adding an additional module to the system.

Additional objectives and embodiments of the present subject matter, not necessarily expressed in this summarized section, may include and incorporate various combinations of aspects of features or parts referenced in the summarized objectives above, and/or features or components as otherwise discussed in this application. Other objects and advantages of the invention may be obvious from the description of the drawings, or may be learned through practice of the invention.

Those of ordinary skill in the art will better appreciate the features and aspects of such embodiments, and others, upon review of the remainder of the specification.

BRIEF DESCRIPTION OF THE DRAWINGS

A full and enabling description of the present subject matter, including the best mode thereof, directed to one of ordinary skill in the art, is set forth in the specification, which makes reference to the appended figures, in which:

FIG. 3b is a side elevational view of the prior art fluid meter depicted in FIG. 3a;

FIG. 15b is a front perspective view of a meter stabilizer apparatus;

Figure 1:
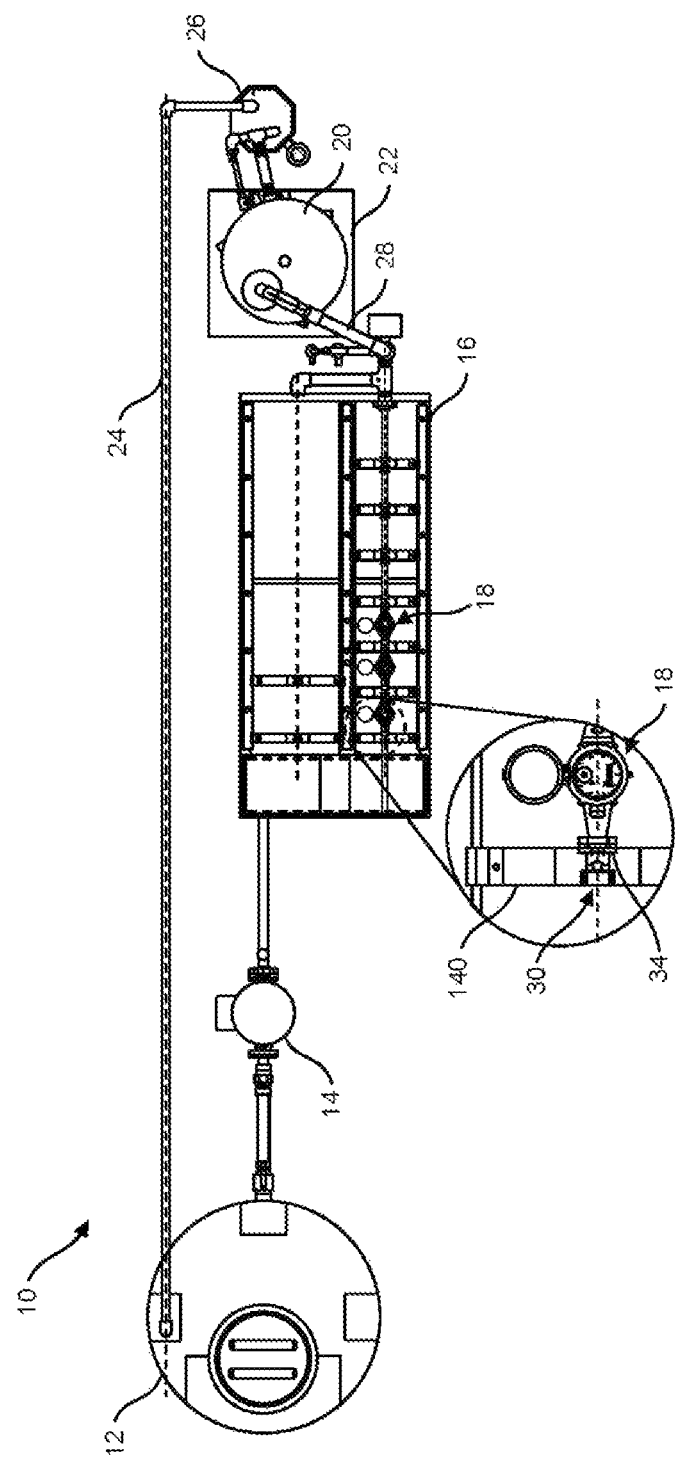
FIG. 1 is a top plan view of a gravimetric test system with a one-piece frame configured with a plurality of meters under and a dual storage tank.

Repeat use of reference characters throughout the present specification and appended drawings is intended to represent the same or analogous features or elements of the present technology.

BEST MODE FOR CARRYING OUT THE INVENTION

Reference now will be made in detail to the embodiments of the invention, one or more examples of which are set forth below. Each example is provided by way of explanation of the invention, not a limitation of the invention. In fact, it will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention covers such modifications and variations as come within the scope of the appended claims and their equivalents. Other objects, features, and aspects of the present invention are disclosed in or may be determined from the following detailed description. Repeated use of reference characters is intended to represent same or analogous features, elements or steps. It is to be understood by one of ordinary skill in the art that the present discussion is a description of exemplary embodiments only, and is not intended as limiting the broader aspects of the present invention.

Definitions

This section defines some of the terms used in this document while other terms are defined within the description.

For the purposes of this document, two or more physical items are "mechanically associated" (sometimes simply "associated") by bringing them together or into relationship with each other in any number of ways, including a direct or indirect physical connection that may be releasable (snaps, rivets, screws, bolts, etc.) and/or movable (rotating, pivoting, oscillating, etc.) Similarly, two or more electrical items are "electrically associated" (sometimes simply "associated") by bringing them together or into relationship with each other in any number of ways, including: (a) a direct, indirect or inductive communication connection, and (b) a direct/indirect or inductive power connection. Additionally, while a drawing may illustrate various electronic components of a system connected by a single line, it will be appreciated that such "signal line" may represent one or more signal paths, power connections/paths, electrical connections and/or cables as required by the embodiment of interest.

This document contains headers. Such headers are place markers inserted for the convenience of the reader and are not to be used in the construction of this document or limit its meaning in any way.

Description

While the examples used in this document relate to systems for testing the accuracy of flow meters measuring the flow/consumption of water, it will be appreciated that such technology can be used to test the accuracy of flow meters measuring other types of fluid.

Fluid meters are configured to measure the volume of a fluid flowing through the meter thereby measuring fluid consumption. Such fluid meters require testing to verify accuracy. Basically, a fluid meter test system pushes a fluid through both a fluid Meter-Under-Test (MUT) and through a very accurate "reference meter". Restated, all the fluid that flows during a test flows through both the MUT (meter under test) and the "reference-meter". The "reference-meter" is configured to generate a very accurate reference-volume reading (which is considered to be the correct reading). Similarly, the meter under test (MUT) measures the volume of fluid that flows through its measuring chamber and generates a MUT-volume reading. Thus, ideally, the MUT-volume reading would be identical to the reference-volume reading. How much the MUT-volume reading varies from the reference-volume reading is considered the MUT metering error.

A fluid meter would ideally have the same meter error at all flow rates. However, in the real world, the meter error is different depending on the flow rate and a fluid meter may measure a 2 gallons/minute flow rate more accurately than 5 gallons/minute flow rate (for example). Thus, meters are typically tested at a plurality of flow rates.

As noted previously, the most accurate way to test water meters is with a gravimetric system. Thus, the "reference meter" described above is actually a gravimetric system that generates the previously described reference-volume reading. While called a "gravimetric system", such system may actually use both gravimetric and volumetric technologies.

Figure 2:
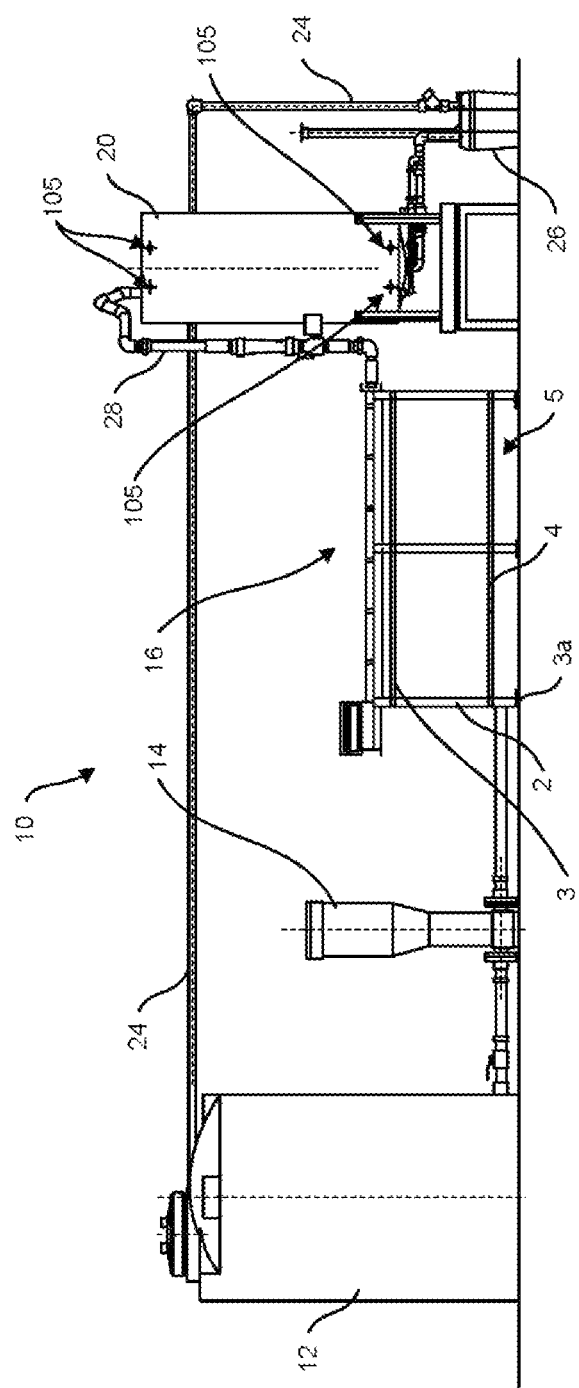
FIG. 2 is a side elevation view of the gravimetric test system depicted in FIG. 1.

Referring now to FIG. 1 and FIG. 2, a Gravimetric Test System (GTS) for testing the accuracy of fluid flow meters is presented. While the fluid could be any fluid, for the embodiments discussed herein the fluid is water. GTS (10) comprises a source tank (12) containing enough water to perform the desired test (say 200 gallows). Source tank (12) is in fluid communication with a supply pump (14) that is in fluid communication with, and supplies fluid to, test bench (16). For one embodiment, test bench (16) comprises a plurality of vertical support rails (2) mechanically associated with lower support rails (4) and upper support rails (3). Preferably, lower support rail (4) is associated a predefined distance from the end (3a) of the vertical support rails (3) to provide a toe space (5). Water from source tank (12) is pumped to and through water meters under test (MUT) (18) and through output path (28) to a measurement tank (20), which rests on scales (22). The scales (22) are used to measure the weight of the water pumped through the MUTs (18) during the test and into the measurement tank (20) where such weight is used (at least in part) to determine a reference-volume value. Such reference-volume value is compared to that of the volumes registered on the various MUTs (18) to determine their accuracy.

After the reference-volume has been measured and the test is complete, the fluid in measurement tank (20) is drained via return lines (24) and returned to the source tank using return pump (26) allowing the fluid to be reused in subsequent tests. One of ordinary skill in the art will appreciate, however, that the source tank (2) may be replaced with any suitable water source and the test fluid may simply be drained from the measurement tank (20) and discarded eliminating the need for return lines (24) and return pump (26).

As can be seen in FIG. 1, a plurality of meters (18) are connected in series, allowing the plurality of meters to be tested simultaneously. The input and output of each meter is associated with an adapter apparatus (34) which is further associated with a bench-to-apparatus interface (30) associated with a test bench flow path. Notably, the inputs and outputs of MUT (18) could be connected with test bench (16) using typical prior art metering couplings; however, such requires much more work and time compared to using a specially made adapter apparatus for coupling a fluid meter to the fluid flow path of a test system according to various aspects of the current invention.

Referring now to FIG. 3 through FIG. 12, an adapter apparatus (34) for coupling a fluid meter (18) to the fluid flow path of a test system is presented.

Figure 4:
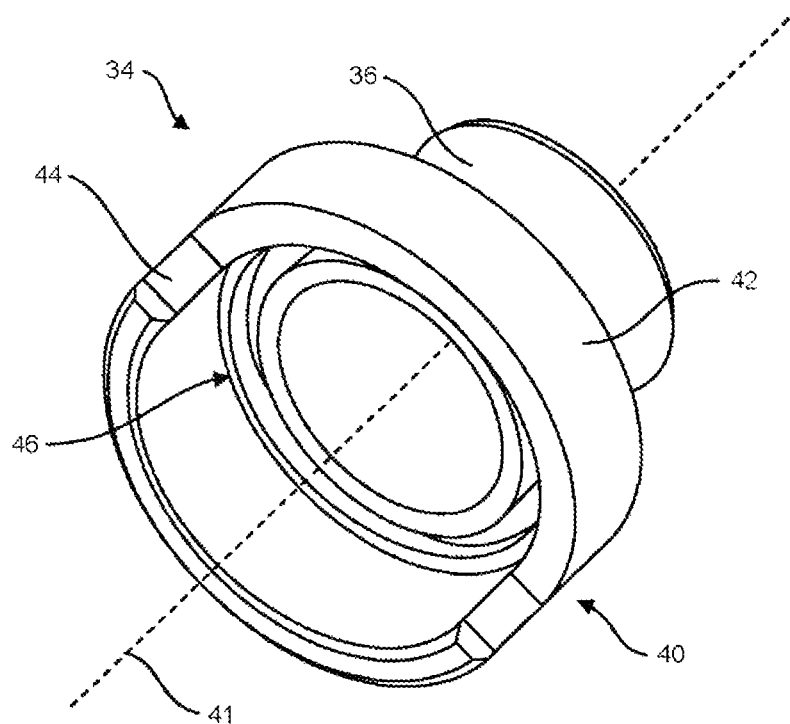
FIG. 4 is a close up elevated perspective view of the adapter apparatus depicted in FIG. 3d.
Figure 5:
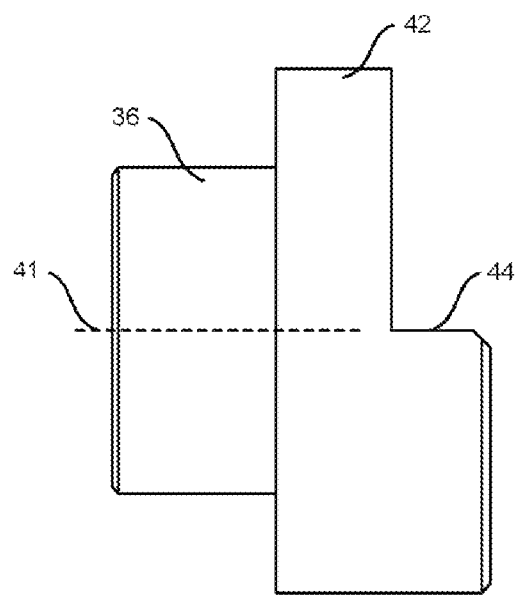
FIG. 5 is a right side elevation view of the adapter apparatus depicted in FIG. 3d.
Figure 6:
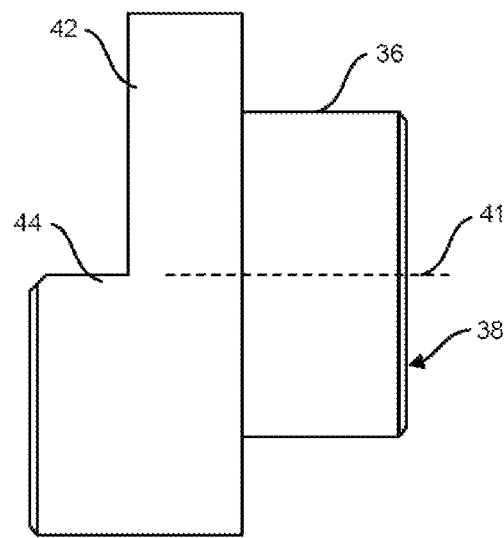
FIG. 6 is a left side elevation view of the adapter apparatus depicted in FIG. 3d.
Figure 7:
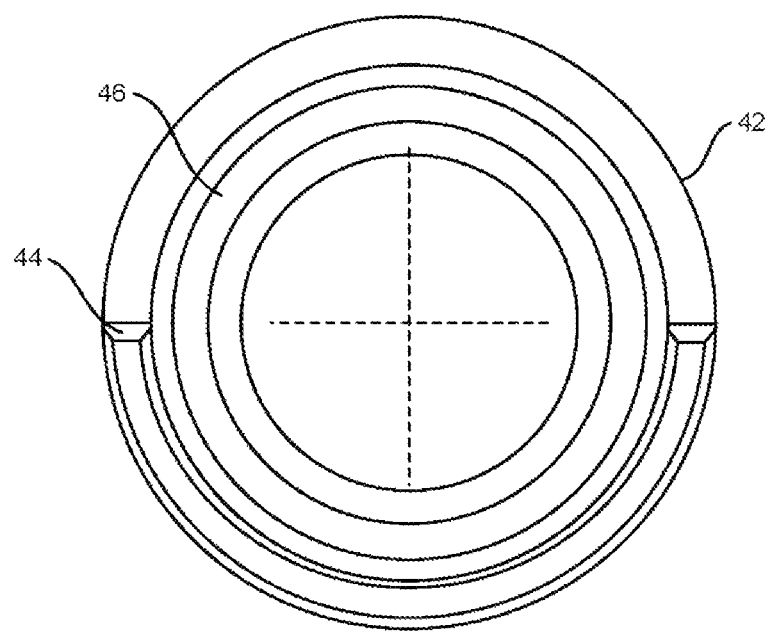
FIG. 7 is a front elevation view of the adapter apparatus depicted in FIG. 3d.
Figure 8:
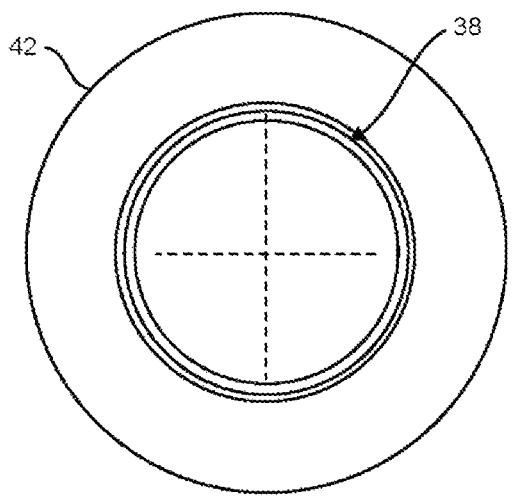
FIG. 8 is a back elevation view of the adapter apparatus depicted in FIG. 3d.
Figure 9:
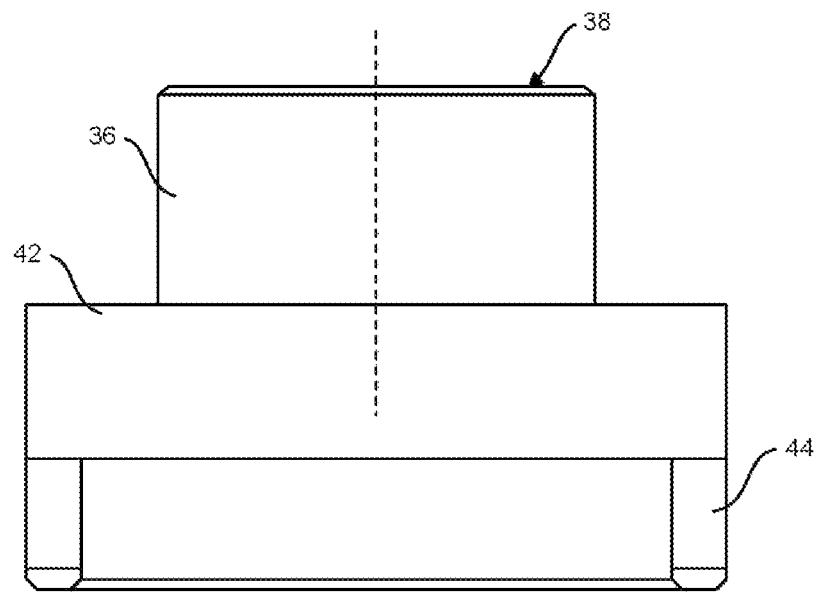
FIG. 9 is a top plan view of the adapter apparatus depicted in FIG. 3d.
Figure 10:
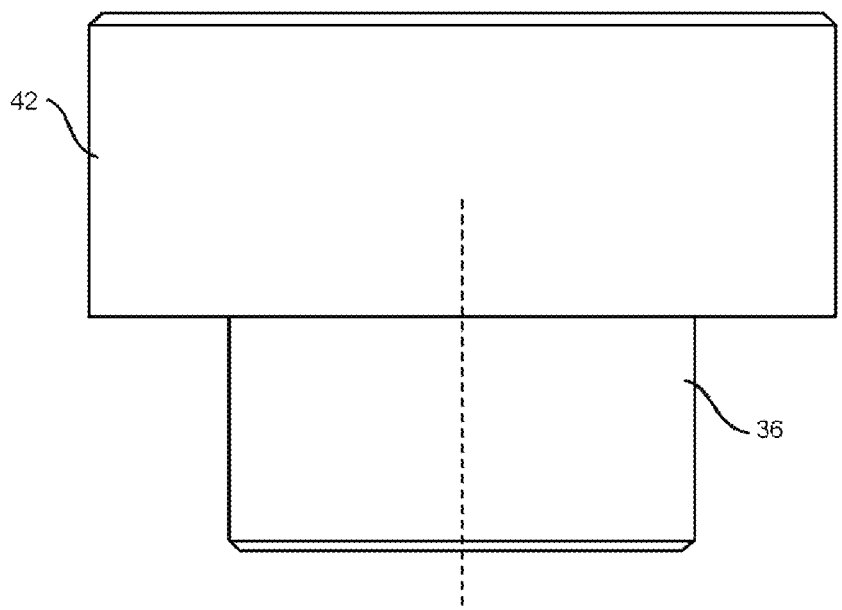
FIG. 10 is a bottom plan view of the adapter apparatus depicted in FIG. 3d.

As best seen in FIG. 4, the apparatus (34) comprises a hollow body (36) defining an apparatus-to-bench interface (38, FIG. 8) at a first end and an apparatus-to-meter interface (40) at an opposing second end. The apparatus-to-bench interface (38) is configured for being associated with a bench-to-apparatus interface (30) defined by a test bench. For the currently preferred embodiment, apparatus-to-bench interface (38) defines a flat surface extending annularly around the end portion of said first end. Alternatively, such interface could employ a groove and o-ring configuration. The body (36) further defines a body-flow-path (41) there through thereby defining an apparatus-to-bench interface (38) outer perimeter and an apparatus-to-bench interface (38) inner perimeter. For example, when said body (36) defines a hollow cylinder, the apparatus-to-bench interface (38) outer perimeter defines the outer circumference of body (36) and the apparatus-to-bench interface (38) inner perimeter defines the inner circumference of body (36).

Figure 3A:
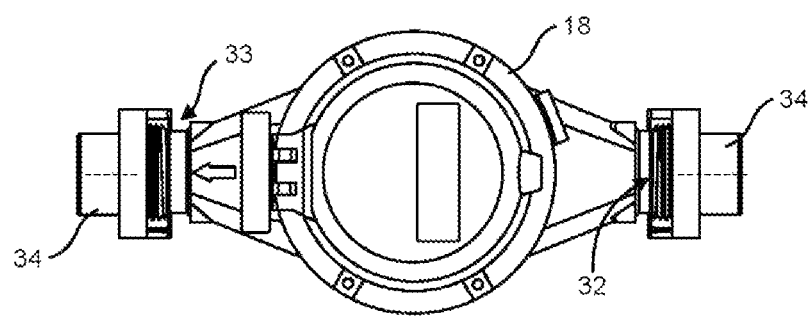
FIG. 3a is a top plan view of a prior art fluid meter with the meter attachment elements associated with an adapter apparatus.
Figure 3B:
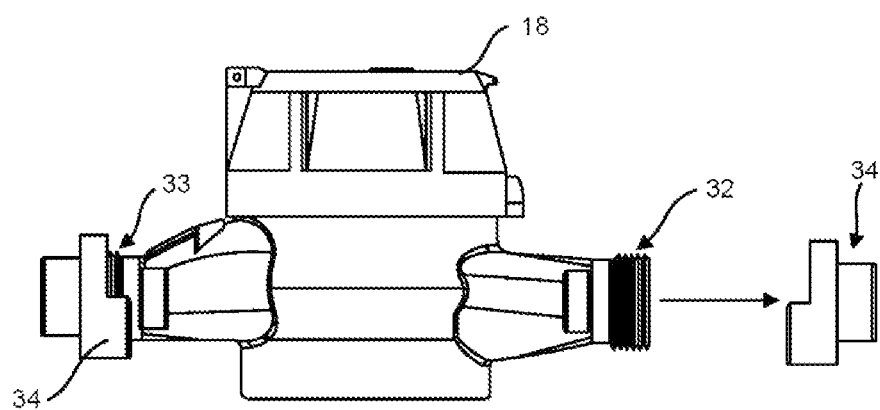

The apparatus-to-meter interface (40) defines a receiver-body (42) defining a receiver-inner perimeter and a receiver-outer perimeter wherein said receiver-inner perimeter is suitably sized to receive a meter attachment element (32, FIG. 3b). For one alternative embodiment, apparatus-to-meter interface (40) further defines a saddle portion (44) extending away from said receiver-body (42) and configured to hold/support said meter attachment element (32). It should be appreciated that when the meters under test (18) are first associated with a GTS (10), they are set loosely in opposing saddle portions (44). During testing, a clamping force is applied to the MUTs forcing them into position as depicted in FIG. 3a. Restated, during testing, when all meters are in place as shown in FIG. 1, the GTS (10) hydraulically clamps the meters in place to form a substantially water tight seal. Thus, saddle portion (44) is configured to provide a support function before the meter is clamped into place. Additionally, saddle portion (44) is further configured to align the center point of said meter attachment element (32) with the center point of said body-flow-path (41) thereby providing an alignment function.

Figure 3C:
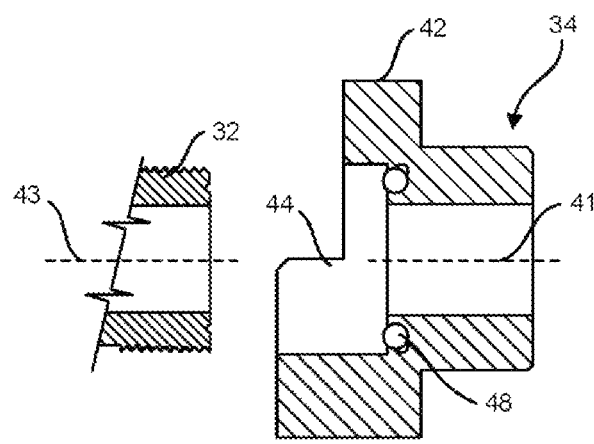
FIG. 3c is a side cross sectional view of an exemplary embodiment of an adapter apparatus showing a seal groove and seal enhancer.
Figure 3D:
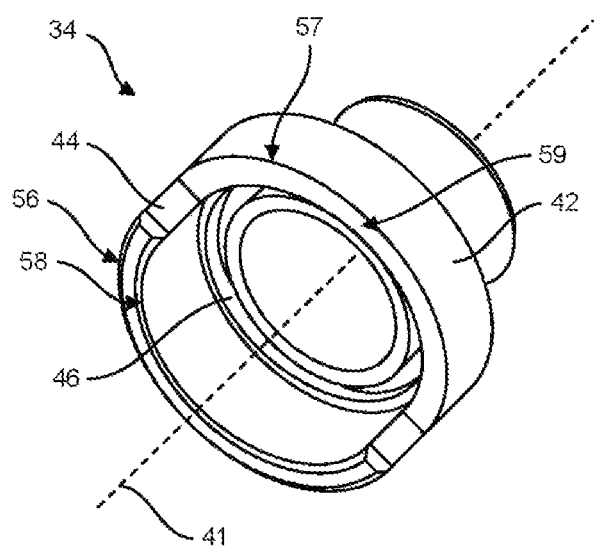
FIG. 3d is an elevated perspective view of the adapter apparatus depicted in FIG. 3d.

As best seen in FIG. 3d, for the currently preferred embodiment, the outer perimeter (56) of said saddle portion is half the length of said receiver-outer perimeter (57) and the inner perimeter (58) of said saddle portion is half the length of said receiver-inner perimeter (59) thereby creating a half circle saddle perimeter for embodiments where the perimeter of said receiver-body (42) defines a circle.

The apparatus-to-meter interface further defines a seal groove (46) [see FIG. 3c, FIG. 4, FIG. 11, FIG. 12] recessed inside said receiver-body (42) and configured to receive a seal enhancer (48) and wherein said seal groove (46) extends annularly around said body-flow path of said second end.

Figure 11:
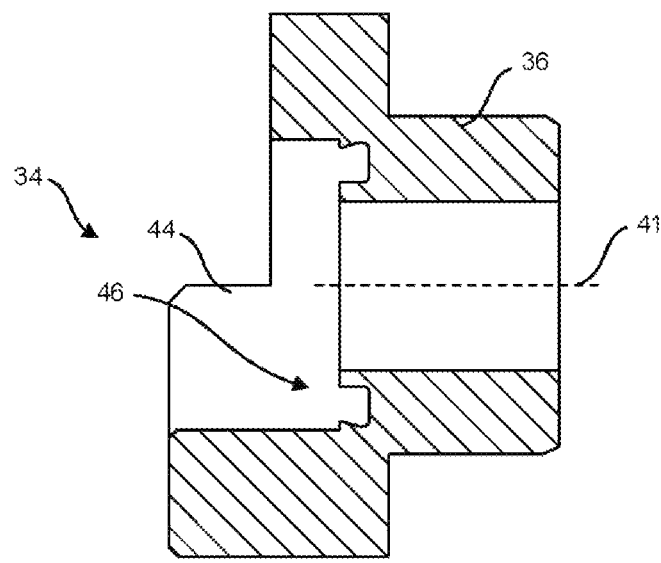
FIG. 11 is a side cross section view of an exemplary embodiment of an adapter apparatus showing a seal groove and no seal enhancer.
Figure 12:
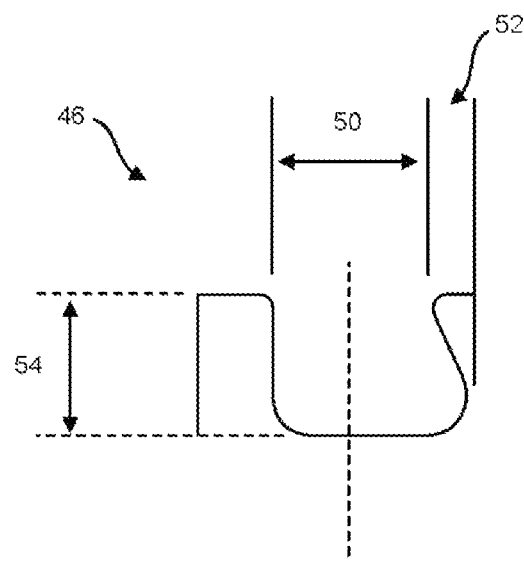
FIG. 12 is a cross sectional view of a seal groove.

As Depicted in FIG. 3c, for the currently preferred embodiment, seal enhancer (48) is an O-Ring suitably configured for associating with said seal groove. It will be appreciated that where the perimeter of the seal groove (46) defines non circular geometric figures (squares, octagons, etc.), the outer perimeter of seal enhancer (48) preferably defines a similar geometric figure. As best seen in FIG. 3c, FIG. 11, and FIG. 12, for one embodiment, seal groove (46)

defines a half-dovetail groove and seal enhancer (48) is an o-ring. For the currently preferred embodiment, groove outer width (50) for seal groove (46) is about 0.124 inches with the dovetail protrusion (52) being about 0.013 inches and the groove depth (54) being about 0.113 inches.

Notably, the various Adapter apparatus (34) component sizes may vary depending on the size of the meter to be associated with a test bench (16). For one embodiment, receiver-body (42) is configured for being associated with a three-quarter inch meter attachment element (32). For such embodiment, the inner diameter of said hollow body (36) is about 0.875 inches and the inner diameter of said receiver body (42) is about 1.3 inches.

For a five-eighths meter, the receiver-body (42) defines an inner diameter of about 1.0 inch and the inner diameter of hollow body (36) is about 0.625 inches. Similarly, for one inch meters, the receiver-body (42) defines an inner diameter of about 1.8 inches and the inner diameter of said hollow body (36) is about 1.1 inches.

As noted previously, the meter under test (18) can be any size meter and the adapter size is selected accordingly. That said, for meter sizes ranging from three-fourths inch, five-eighths inch, and one inch, for one embodiment of the design, the adapter apparatus (34) is configured so that the dovetail groove (46) cross-section parameters do not change in size, only the major outside diameter size and minor inside diameter changes. The same is true for the seal enhancer (48). For a three-fourth inch meter, the O-Ring has the following dimensions: 1" inside diameter, 1.25" outside diameter and a width of ⅛" where the inside diameter tolerance is 0.984±0.010, and the width tolerance is 0.139±0.004. For five-eighths meters, three-fourths inch ID, 1" OD and a width of ⅛" where the ID tolerance is 0.734±0.010, and the width tolerance is 0.139±0.004. For the 1 inch meters, 1⁵⁄₁₆" ID, 1⁹⁄₁₆" OD and a width of ⅛" where the ID tolerance is 1.296±0.012, and the width tolerance is 0.139±0.004.

One of ordinary skill in the art will appreciate that the seal groove and seal enhancer configuration allows much lower clamping pressures compared to prior art systems. Such lower clamping pressures are particularly advantageous when testing the newer composite case meters where lower clamping pressures are desired to avoid deforming the measurement chambers of such meters.

Large Meter Stabilizer Adapter

Referring now to FIG. 15-FIG. 20, one exemplary embodiment of a meter stabilizer apparatus (MSA) (70) for supporting and coupling a fluid meter to the fluid flow path of a test system is presented. For the preferred embodiment MSA (70) comprises a U-shaped support frame (72) comprising two vertically extending support members (74) mechanically associated with a horizontal member (76). Optional angular support members (73) may be used to mechanically associate the vertically extending support members (74) to the horizontal member (76). Notably, for yet another alternative embodiment, there is no horizontal support member (76) and the angular support members (73) simply connect at their upper end points. Preferably, each vertically extending support member (74) either defines an integral latching device (78) or is mechanically associated with a latching device (78) at its lower end (75). Each, vertically extending support member (74) further defines a vertical-member-interface (82).

As depicted in the various figures, each latching device (78) is configured to receive at least one locking member (80). Suitable embodiments of a locking member include pins and bolts and nuts.

Figure 15:
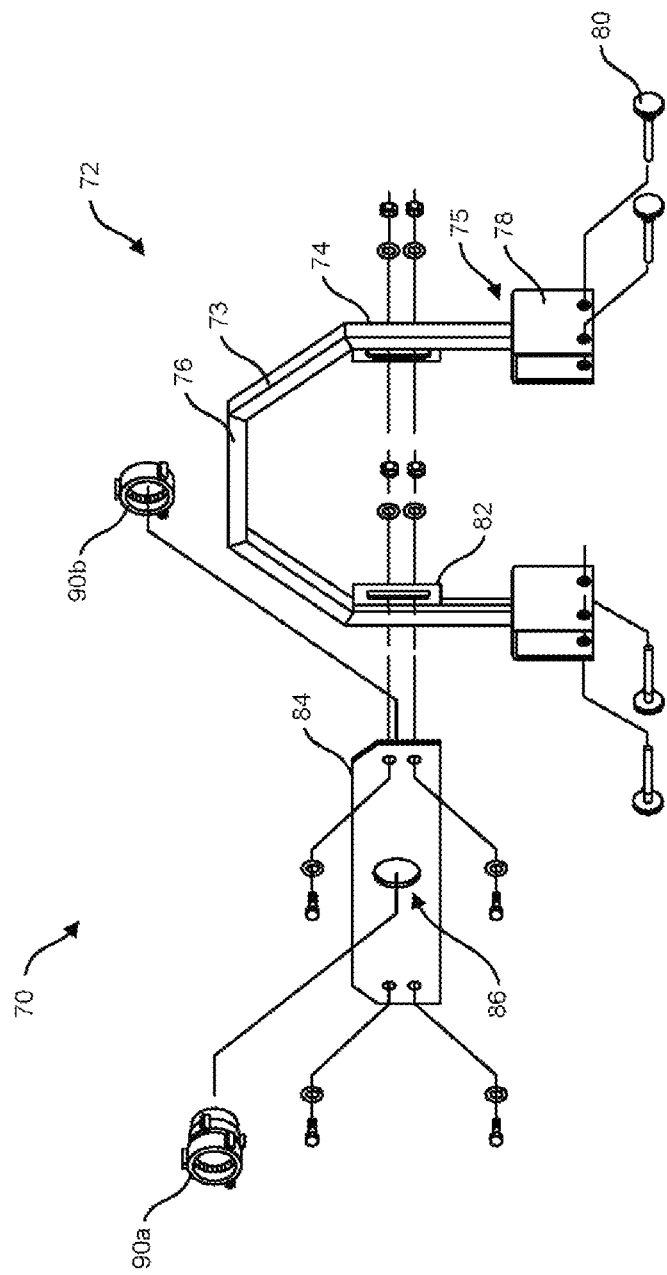
FIG. 15 is a front perspective exploded view of a meter stabilizer apparatus.
Figure 16A:
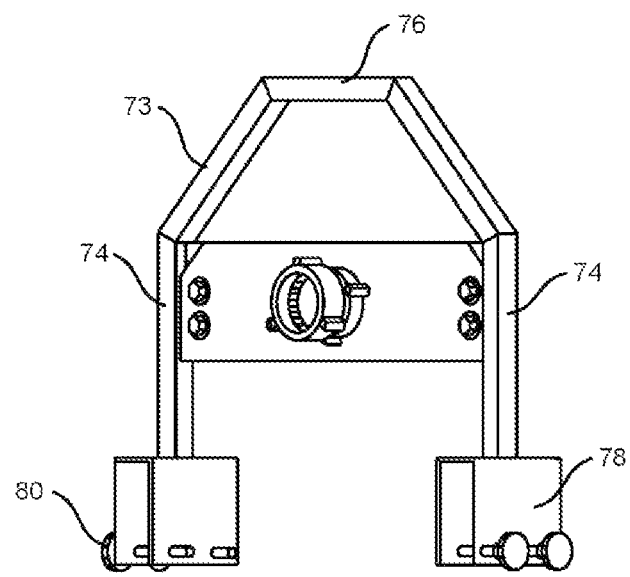
FIG. 16 is a back perspective view of a meter stabilizer apparatus.
Figure 16B:
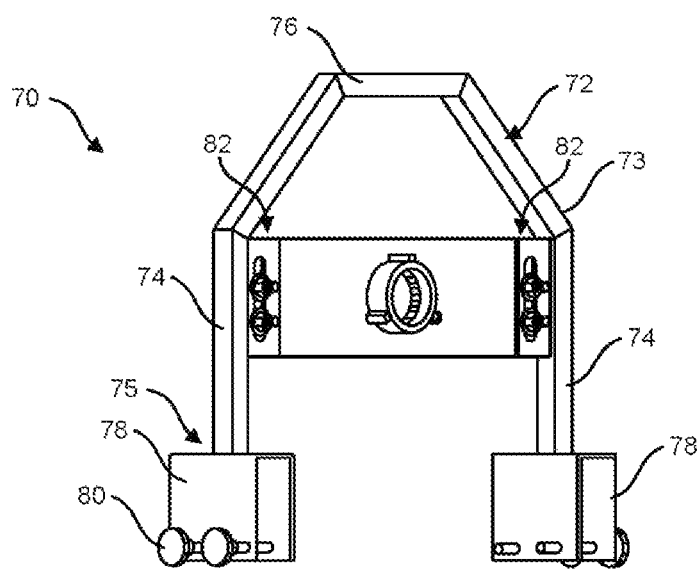
Figure 17:
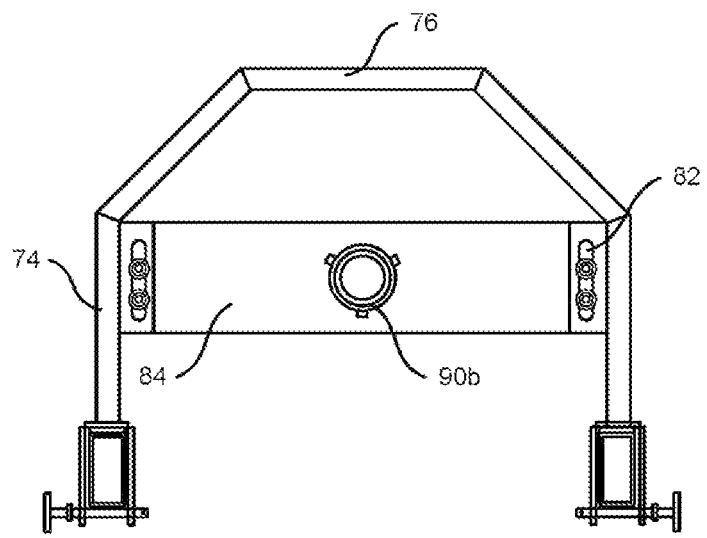
FIG. 17 is a front elevation view of a meter stabilizer apparatus.
Figure 18:
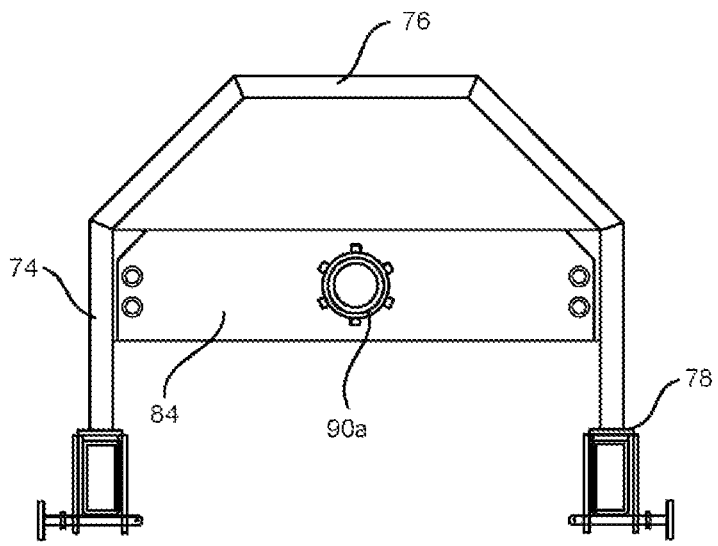
FIG. 18 is a back elevation view of a meter stabilizer apparatus.
Figure 19:
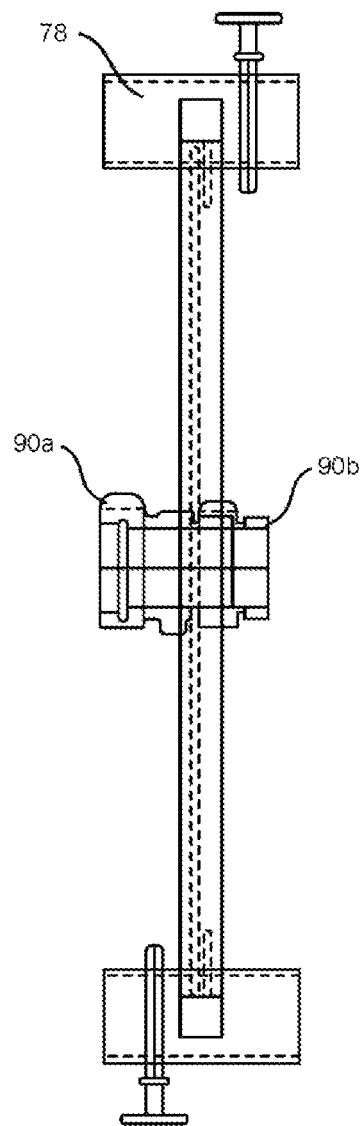
FIG. 19 is a top plan view of a meter stabilizer apparatus.
Figure 20:
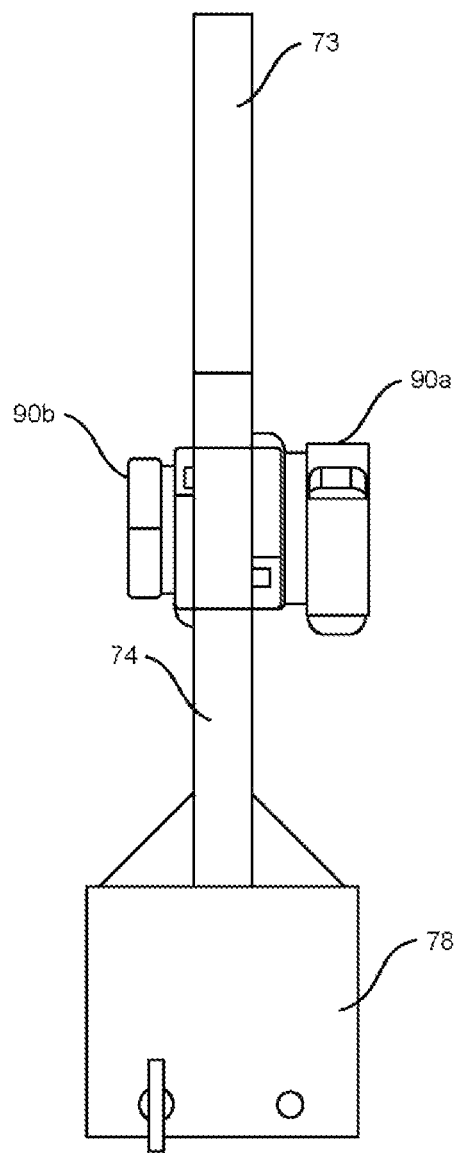
FIG. 20 is a side elevation view of a meter stabilizer apparatus.

As depicted in FIG. 15, FIG. 15a and FIG. 16, MSA (70) further comprises a horizontal adapter plate (84) configured for being mechanically associated with said vertical-member-interface (82). The horizontal adapter plate (84) further defines a coupling interface (86) that extends through the horizontal adapter plate. As depicted in FIG. 15, for one exemplary embodiment, such coupling interface defines a hole.

MSA (70) further comprises a coupling adapter (90) defining a first coupling end (90a) and an opposing second coupling end (90b) and wherein said coupling adapter (90) is mechanically associated with and extends through said coupling interface (86) so that said first coupling end (90a) is on one side of said horizontal adapter plate (84) and said second coupling end (90b) is on the opposing side of said horizontal adapter plate (84). The first coupling adapter end (90a) and the second coupling adapter end (90b) are configured for being associated with a meter attachment element of a fluid meter and/or a test bench flow path attachment point. One of ordinary skill in the art will appreciate that such a configuration allows a plurality of meters to be connected in series and tested at the same time. For example, if one wished to test 5 meters, one would use four MSA (70) device to align, support and stabilize the meters with the test bench.

Suitable coupling adapters (90) include swivel adapters that attach securely to the horizontal adapter plate but include a swivel end that can be mechanically associated with the meter attachment member of a fluid meter.

Latching devices (78) are configured for mechanically and moveably associating said U-shaped support frame with at fluid meter test bench support rail. The latching devices are further configured to slide along such support rails to a desired point along the support rail. The locking members (80) are configured to lock the mechanical association between said U-shaped support frame and said test bench so that the MSA (70) device cannot tip over. It should be appreciated that for some configurations locking members (80) will lock the MSA (70) device in place. For one embodiment, the locking members (80) simply keep the MSA (70) device from falling over and allows the MSA (70) device to slide along the test bench support rails.

As best seen in FIG. 15, each vertical-member-interface (82) defines an adjustment function to allow the mechanical association between said vertical-member-interface (82) and said horizontal adapter plate (84) to be adjusted. For the embodiment in FIG. 15, such is accomplished by using vertical slots.

Dual Measurement Tank

Referring now to FIG. 1, FIG. 2, FIG. 13 and FIG. 14, a dual measurement tank (100) for storing a fluid used during a fluid flow testing procedure is presented. As can be seen in such figures, the "dual" measurement tank (100) comprises a second tank (110) inside a first tank (102) thereby creating the "dual tank" configuration.

For the currently preferred embodiment, dual measurement tank (100) comprises a first tank (102) defining a hollow cylinder comprising a first tank upper end (104) and a first tank lower end (106). The first tank upper end (104) is open (like the upper end of a cup) and the first tank lower end (106) defines a first tank bottom (108). The first tank defines a first tank height and a first tank diameter, thereby defining a first tank volume.

Dual measurement tank (100) further comprises a second tank (110) defining a hollow cylinder comprising a second tank upper end (112) and a second tank lower end (114). The second tank upper end (112) is open and the second tank lower end (114) defines a second tank bottom (116). The second tank defines a second tank height and a second tank diameter, thereby defining a second tank volume.

The first tank bottom (108) defines a first tank drain port (109) that extends through the approximate center of such first tank bottom (108). Such drain port is configured to drain the fluid out of said first tank once the testing and measurements are complete. Similarly, the second tank bottom (116) defines a second tank drain port (118) at the approximate center of such second tank bottom (116). The second tank drain port (118) is configured to drain the fluid out of such second tank once the testing and measurements are complete.

The first tank bottom further defines a drain port interface (107) configured for being associated with said second tank drain port (118). One embodiment of such an interface is a hole that is mechanically associated with the second tank draining port using means such as welding to define a leak proof seal. Notably, the distance from the side of the first tank (102) and the drain port interface (107) is greater than the diameter of the second tank (110) to provide for a predefined second tank offset (111). Such tank offset allows water to more fully drain after testing.

Figure 13:
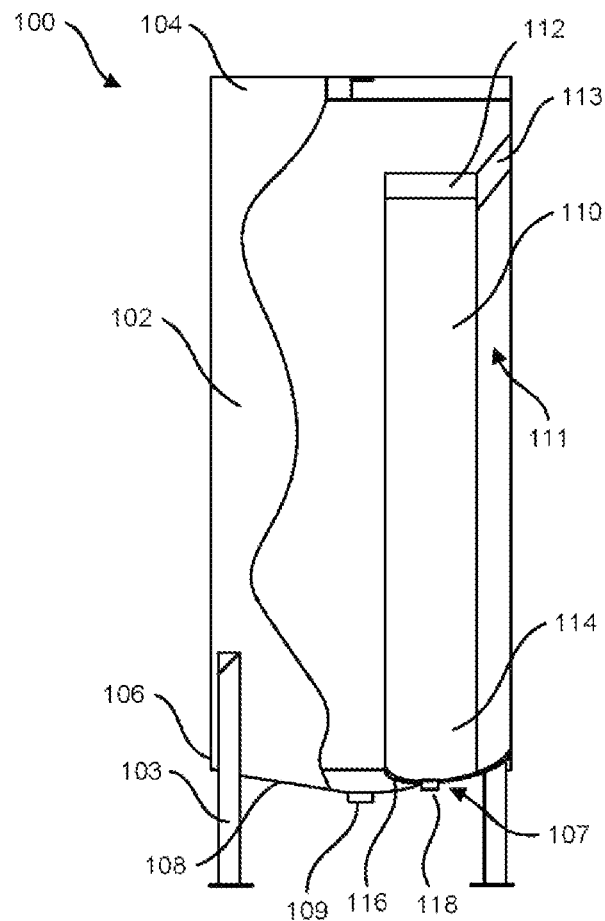
FIG. 13 is a side elevation view with a cut away section of a dual measurement tank showing the inside tank.
Figure 14:
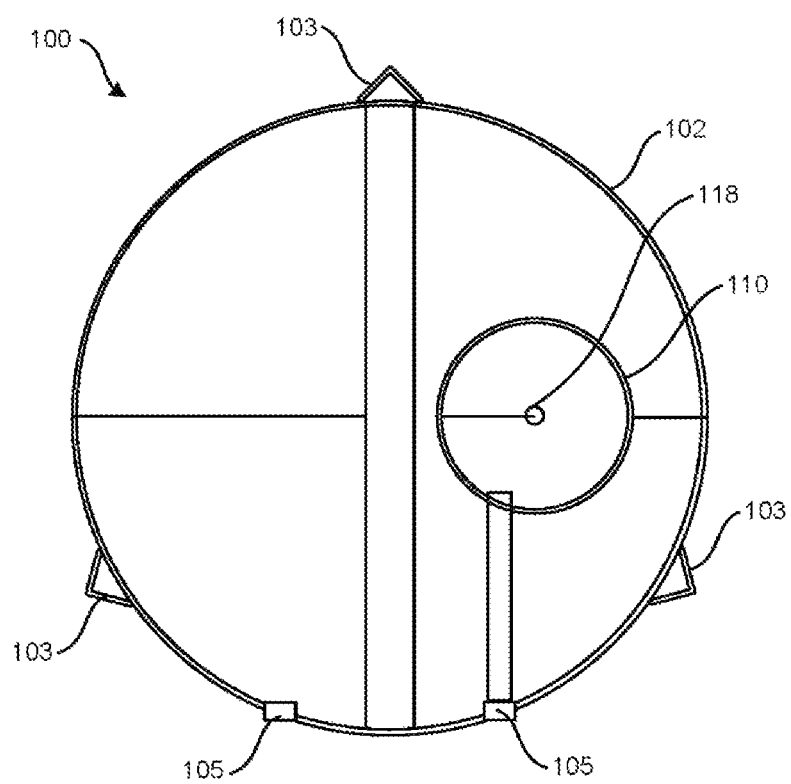
FIG. 14 is a top plan view of a dual measurement tank.

As depicted in FIG. 13, the second tank (110) is disposed inside said first tank (102) so that the drain port interface (107) is associated with the second tank drain port (118). Preferably such association is water tight. An upper support arm (113) is configured to mechanically associate an upper section of the second tank upper end (112) to said first tank (102) to help stabilize the second tank.

For one embodiment, both tanks further define volume indicator ports (105) configured for being associated with volume indicators. Such volume indicators are typically graduated clear tubes that indicated the volume of water in the associated container.

Support members (103) are mechanically associated with the outside of the first tank and are configured to support the measurement tank (100) on a scale configured to measure the weight of the dual measurement tank (100) including any fluid inside the dual measurement tank (100).

To enhance draining, the first tank bottom (108) and the second tank bottom (116) define a convex surface extending away from the tanks and the drain ports are defined at the center of said convex surface. Such a configuration enhances draining of all the fluids from the measurement tank (100) after tests and measurements are complete.

Exemplary dual measurement tank volumes include a first tank volume of 100 gallons and said second tank volume of 10 gallons. As depicted in FIG. 1, the test bench output flow path (28) is configured to dump the water that flows through the meters under test (18) into the second tank (110). If a 10-gallon slow flow test is being performed, the fluid only dumps into the second tank. If a 110-gallon test is being performed, the fluid is again dumped into the second tank until it becomes full and then the fluid overflows into the second tank and starts to fill the first tank. At the end of the testing both tanks contain water and the weight of such water is measured by a scale to determine the volume of water in the dual measurement tank (100) which is called the reference volume (for this document). The volume of fluid flow through each meter under test (18) is recorded by each individual meter and such values are compared to the reference-volume. The amount of variation is called the meter error.

One of ordinary skill in the art will appreciate that prior art systems use a plurality of individual tanks with each tank having its own scale. (for example: a 100-gallon tank and associate scale and a 10-gallon tank and associated scale). Such a configuration not only consumes considerably more space than the dual tank system, such a configuration is significantly more expensive. Further, some of the disclosed embodiments will work equally well with a volumetric test system.

Modular Test System

Referring back generally to FIG. 1 and FIG. 2, a Gravimetric Test System (GTS) (10) for testing the accuracy of fluid flow meters is presented where the system is designed around an integral frame. While referred to as a gravimetric test system, it should be appreciated that such system uses both volumetric and gravimetric testing technologies. The GTS (10) comprises a fluid source tank (12) in fluid communication with a supply pump (14) that is in fluid communication with, and supplies fluid to, test bench (16). In the embodiment depicted in FIG. 1 and FIG. 2, test bench (16) comprises an integral frame where the vertical support rails (2) are mechanically associated with lower support rails (4) and upper support rails (3) so that the test bench (16) component of the GTS (10) system is a one-piece integral component.

Figure 21:
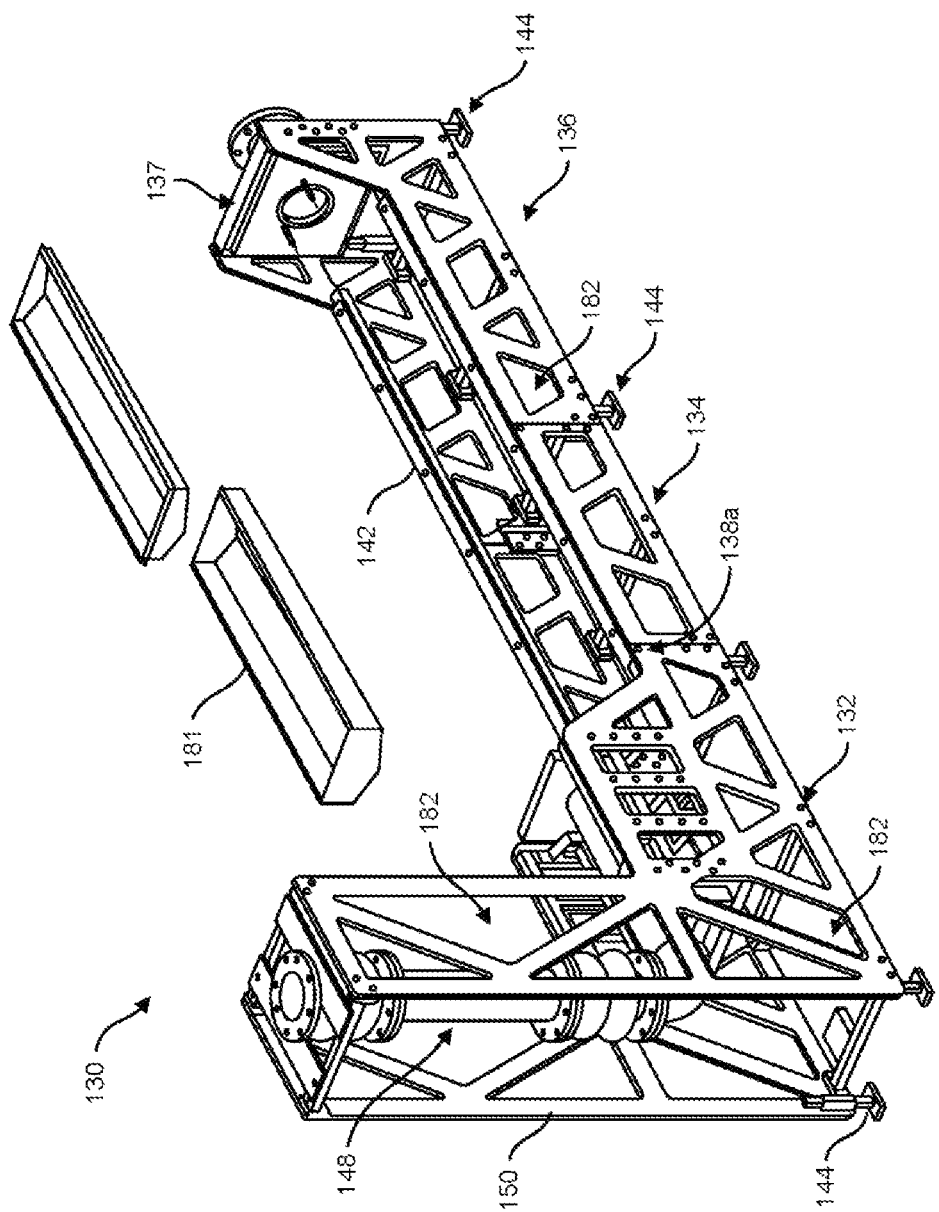
FIG. 21 is an elevated perspective view of one exemplary embodiment of a modular test bench structure comprising an input module, center module, and an output module.
Figure 22:
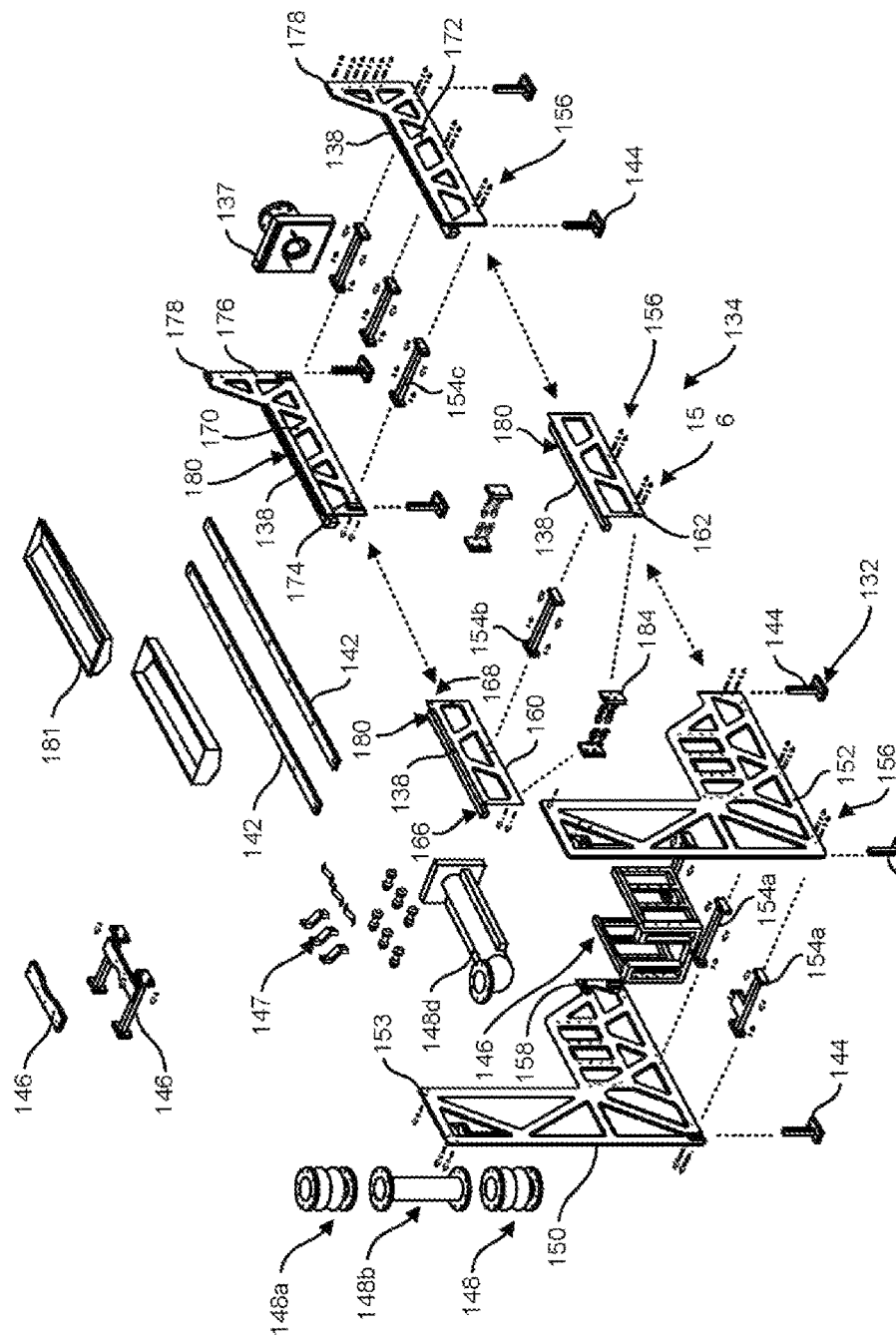
FIG. 22 is an exploded view of the modular test bench structure depicted in FIG. 21.
Figure 23:
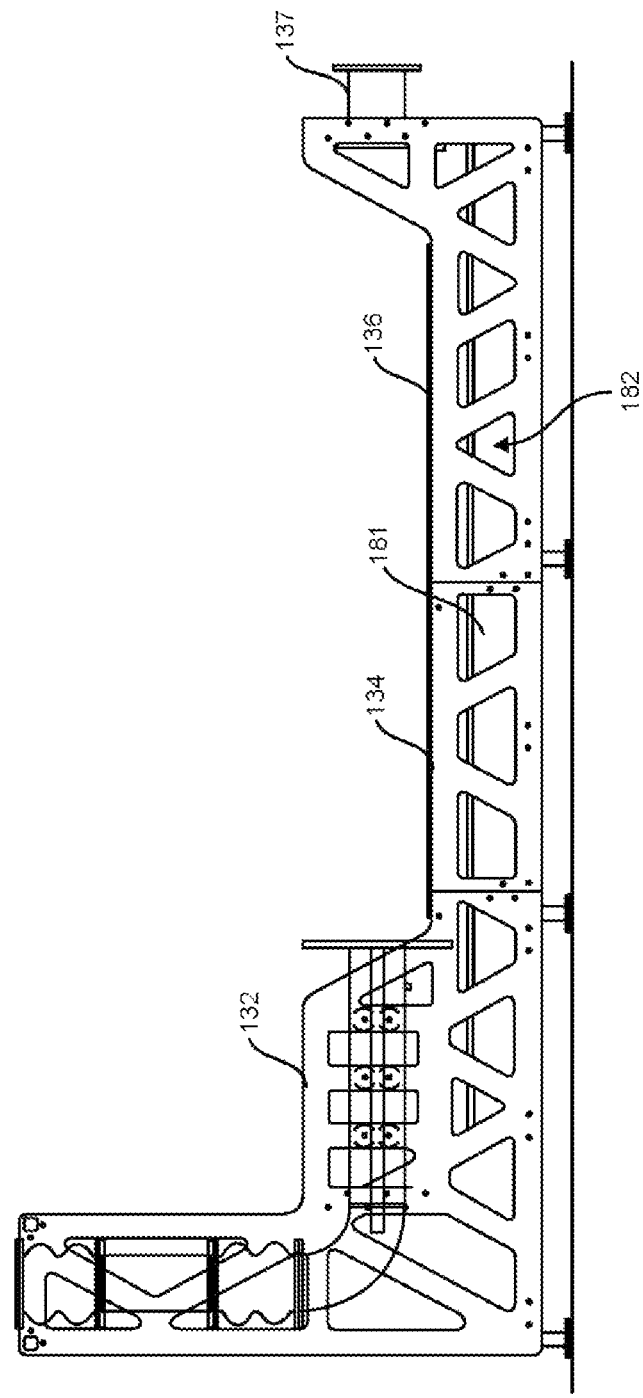
FIG. 23 is a side elevation view of the modular test bench structure depicted in FIG. 21.
Figure 24:
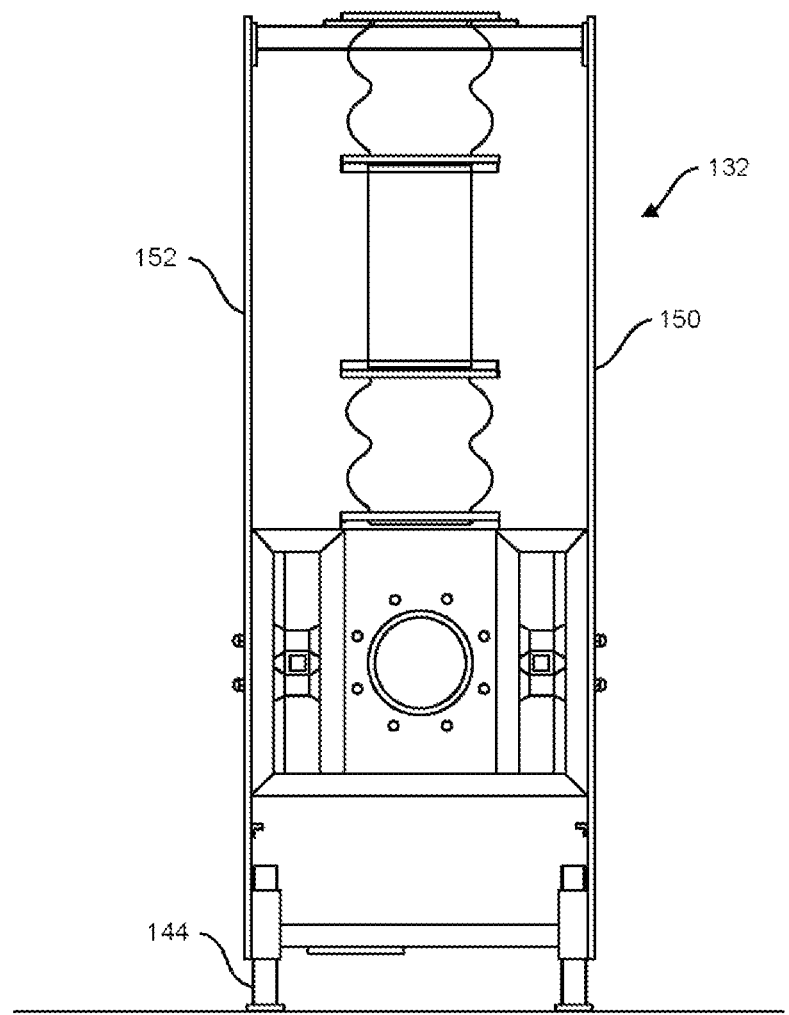
FIG. 24 is a side elevation view of the input module for the modular test bench structure depicted in FIG. 21.
Figure 25:
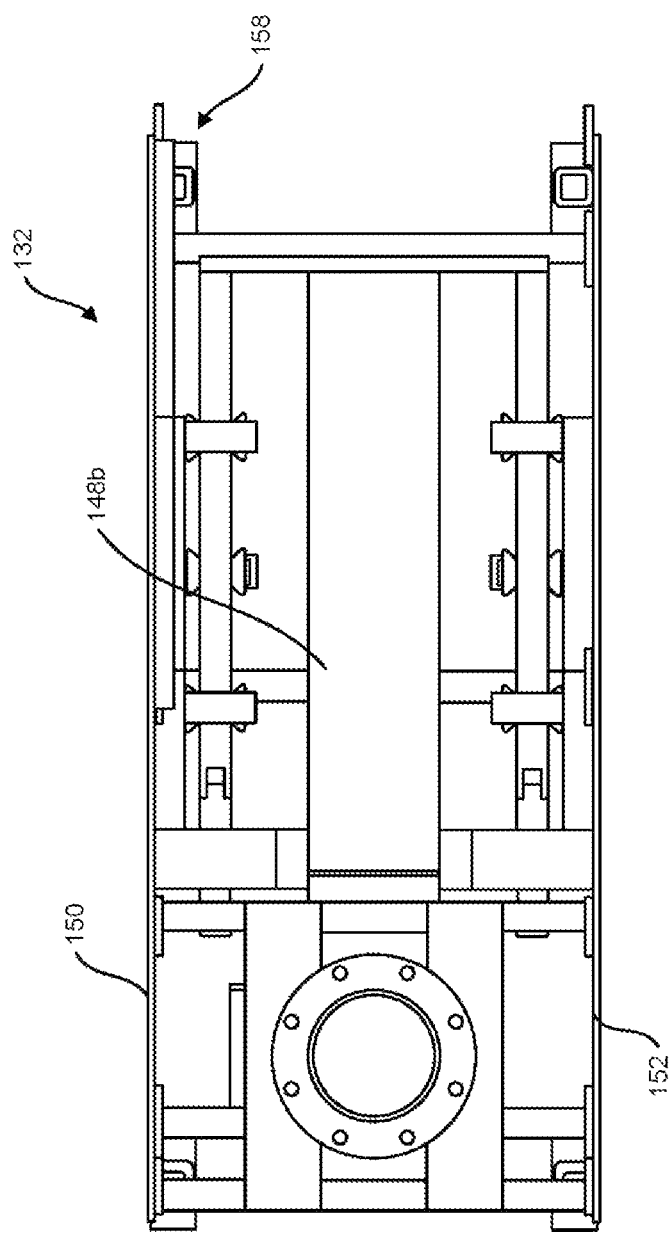
FIG. 25 is a top plan view of the input module for the modular test bench structure depicted in FIG. 21.
Figure 26:
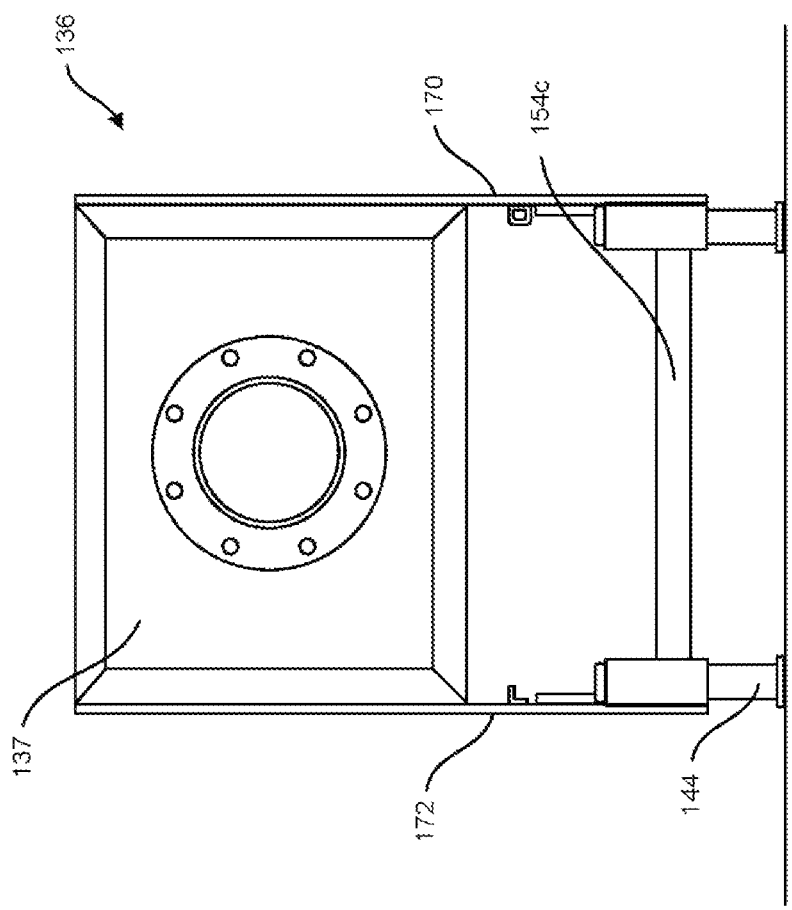
FIG. 26 is an elevation view of output module for the modular test bench structure depicted in FIG. 21.
Figure 27:
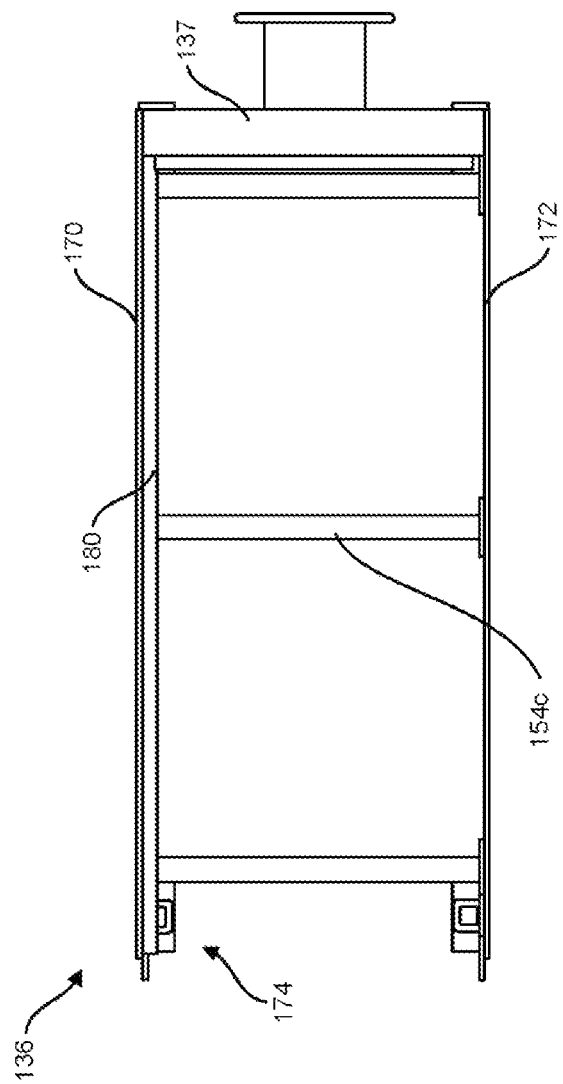
FIG. 27 is a top plan view of output module for the modular test bench structure depicted in FIG. 21.

Referring now to FIG. 21 through 27, a more Modular fluid meter Test System (MTS) (130) is disclosed. As best seen in FIG. 21 and FIG. 22, for the currently preferred embodiment, MTS (130) comprises an input module (132) mechanically releasably associated with a middle module (134) that is further mechanically releasably associated with an output module (136). At least the middle module (134) defines a pair of parallel support surfaces (138, FIG. 22) movably and mechanically associated with a plurality of meter supports (140, FIG. 1). As depicted in FIG. 22, a portion of output module (136) also defines a pair of parallel support surfaces (138). For embodiments not comprising a middle module (134), either or both of the input module (132) and the output module (136) define the support surfaces (138).

One exemplary embodiment of MTS (130) further comprises two top rails (142) configured to enhance the structural integrity of the test system. Each top rail (142) defines a one-piece structure that defines one of the support surfaces (138). Each top rail (142) runs the full length of the middle module (134) and at least a part of the length of at least one of (a) the input module (132) and the output module (136).

In the embodiment depicted in FIG. 21, a portion of the input module (132) further defines a short section of support extensions (138a) configured to mechanically associate with a portion of top rails (142). Top rails (142) preferably mechanically associate with the support extension (138a), the full length of support surfaces (138) defined by the middle module (134) and the full length of the support surfaces (138) defined by the output module (136). One of ordinary skill in the art will appreciate that such a configuration enhances the structural integrity of the system.

Referring to FIGS. 21 and 22, at least the input module and output module each define a plurality of leveling elements (144). Leveling the MTS (130) is important for providing a more accurate reference volume value. The leveling elements preferably provide for an "infinite" number of adjustments such as a thread bolt type adjustor wherein the resolution of the adjustment is defined by the thread gap distance.

For the currently preferred embodiment, the input module (132) is configured to support an input manifold carrier assembly (146) configured to be mechanically and movably associated with an input manifold (148) in fluid communication with a water source (12). Input manifold (148) comprises a first flexible portion (148a) in fluid communication with a fluid source at one end. The second opposing end of flexible portion (148a) is mechanically associated and in fluid communication with rigid portion (148b) which is mechanically associated and in fluid communication with second flexible portion (148c) which is mechanically associated and in fluid communication with horizontal portion (148b) which is mechanically associated with input manifold carrier assembly (146) so that the output of horizontal portion (148b) extends to the approximate end of input module (132).

MTS (130) further comprises an output port (137) that is one of (a) integral to and (b) mechanically associated with said output module (136). For the embodiment currently being considered, output port (137) is mechanically associated with output module (136). In either case, the output port is considered part of the output module (136) although embodiments where the output port is a separate component fall within the scope and spirit of the invention. As best depicted in FIG. 1 and FIG. 2, output port (137) is in fluid communication with a measurement container (20). Flow meters may be associated along the fluid path between output port (137) and measurement container (20) to provide an indication that the fluid flow rate is consistent with a desired flow rate for a particular test.

MTS (130) further comprises a clamping force generator mechanically associated with manifold carrier assembly (146). The clamping force generator configured to apply/generate a clamping force between the input manifold (148), the meters under test (18) and the output port (137) so that a fluid-tight-flow-path is created between the fluid source (12), the meters under test (18) and said output port (137). Embodiments of a clamping force generator include any number of technologies that can create a pressure such as a hydraulic pump driven by an electric motor, and electric motor, and a pneumatic system. Such technologies are well known in the art and a detailed description thereof is not necessary for an enabling description. For the preferred embodiment, the clamping force generator is a hydraulic pump activated by an electric motor.

MTS (130) further comprises a fluid flow generator such as supply pump (14) where such fluid flow generator is in fluid communication with the test fluid source (12). The fluid flow generator (14) is configured for generating fluid flow through the fluid-tight-flow-path during testing. As with the clamping force generator any number of technologies can be used to pump fluid through a system and a detailed description of such component is not provided.

MTS (130) further comprises a computing device that executes the testing software. For the current embodiment, a controller is electrically associated with the clamping force generator and the fluid flow generator and is configured to activate the clamping force generator to create and release such clamping force. The controller is further configured to activate the fluid flow generator to create fluid flow at a predefined flow rate through the fluid-tight flow-path until a predefined volume has passed through said fluid-tight flow-path and into said measurement container (20).

As best seen in FIG. 1, each meter support (140) is configured to support a meter under test so that when a clamping force is applied to the system, the meters under test are clamped together in series along the test bench where the output of one meter is placed in fluid communication with the input of the next meter and so on down the line until the last meter's output is in fluid communication with the output port (142). The first meter's input is placed in fluid communication with the input manifold (148). Such completes the fluid tight flow path from the fluid source (12) to the measurement container (20).

Module Components

In some embodiments of the invention, MTS (130) is constructed from component parts that are removably mechanically associated so that the modules can be shipped to a user's location disassembled. For such embodiments, the modules comprise panels as now described.

Input module (132) comprises a left input panel (150) mechanically removably associated with a right input panel (152) by a plurality of cross members (154a). Such panels are releasably mechanically associated with the cross members using releasable attachment elements (156). Exemplary embodiments of suitable releasable attachment elements include nuts and bolts. One end of each of said input panels define at least one input module interface (158). As depicted in FIG. 22, such input module interface includes a hollow conduit element which is also configured to (a) enhance structural integrity as describe later and (b) house electrical wiring. Preferably, the input module interface (158) defines either a male type interface or a female type interface. The interface (158) depicted in FIG. 22 defines a female type interface. Notably, left input panel (150) and right input panel (152) may further define vertical extensions (153) configured for being mechanically associated with a portion of the input manifold (148).

Similarly, middle module (134) comprises a left middle panel (160) mechanically removably associated with a right middle panel (162) by at least one cross member (154b). As before, releasable attachment elements (156) secure the cross member(s) (154b) to the middle panels. A first end of each middle panel defines a first-middle-panel-interface (166) and the opposing second end of each middle panel defines a second-middle-panel-interface (168). The first-middle-panel-interface (166) is releasably mechanically associated with at least one input module interface (158). Similarly, the second-middle-panel-interfaces (168) are mechanically associated with output module interfaces describe later.

As described above for the input module interfaces, the middle panel interfaces include a hollow conduit element which is also configured to enhance structural integrity as described later. Preferably, the middle-panel-interfaces define either a male type interface or a female type interface. In the embodiment depicted in FIG. 22, the first-middle-panel-interfaces (166) define male interfaces and the second-middle-panel-interfaces (168) define female interfaces. By alternating the interface types between modules, structural integrity is enhanced and adding expansion modules is significantly less complicated.

The output module (136) comprises a left output panel (170) mechanically removably associated with a right output panel (172) by a plurality of cross members (154c) (although only one cross member may be used). As before, releasable attachment elements (156) secure the cross member(s) (154c) to the output panels. A first end of each output panel defines an output module interface (174) and the opposing second end of each output panel defines an output port interface (176) configured for being mechanically and removably associated with output port (137). Preferably, the output module interface (174) defines a male type interface suitably configured for being associated with a female type interface defined by the second middle-panel interface (168). The second end of each output panel may further define vertical extensions (178) configured to removably mechanically associate with the output port (137).

Notably, while there may be some variation of the perimeter shape of cross members (154a, 154b, 154c), such cross members preferably have identical lengths so that the distance between adjacent panels for each module is constant thereby creating a substantially constant width across the various modules when assembled and mechanically associated together.

As best seen in FIG. 22, at least a portion of input module (132), the middle module (134) and the output module (136) define a conduit element (180) configured for receiving electrical wiring. For the currently preferred embodiment, conduit element (180) extends across almost the full length of the middle module and a majority of the length of the output module. Further, at least a portion of each of the input module interface (158), the first-middle-panel-interface (166), the second-middle-panel-interface (168), and the output module interface (74) make up a section of said conduit component so that such conduit element extends from the input module to the output module thereby enhancing the overall structural integrity of the assembled MTS (130).

Preferably, at least one of said left input panel, said right input panel, said left middle panel, said right middle panel, said left output panel and said right output panel define a plurality of cutout portions (182). Such cutout portions (182) reduce the weight of the MTS (130) and can be used to add an ornamental design to the MTS (130). Additionally, material of such cutout portions (182) can be used to form other parts of the MTS (130). For example, the splice plates (184) described below are created using material from a cutout portion (182).

To further enhance structural integrity of the MTS (130), splice plates (184) are used between modules. As best seen in FIG. 22, splice plates (184) are mechanically associated with at least one end of input panels, middle panels and output panels. In one exemplary embodiment, splice plates (184) are considered part of a module interface so that at least one of the input module interface (158), first-middle-panel-interface (166), second-middle-panel-interface (168), and output module interface (174) further comprises such a splice plate (184).

Another unique feature of the modular panel design is the ability to easily enhance structural integrity of the system so that the MTS (130) can handle the extreme pressures that can be generated from testing high pressure equipment. When more structural integrity is required, all that need be done is add/stack side panels to the system and use modified releasable attachment elements (156).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A modular fluid meter test system configured for testing the accuracy of fluid flow meters, said modular fluid meter test system comprising:
    an input module mechanically releasably associated with a middle module mechanically releasably associated with an output module and wherein at least the middle module defines a pair of parallel support surfaces mechanically associated with a plurality of meter supports wherein each meter support is configured to support a meter under test and wherein at least the input module and output module each define a plurality of leveling elements;
    an input manifold carrier assembly mechanically and movably associated with said input module wherein said input manifold carrier assembly is mechanically associated with an input manifold in fluid communication with a water source;
    an output port that is one of (a) defined by said output module and (b) mechanically associated with said output module and wherein said output port is in fluid communication with a measurement container;
    a clamping force generator mechanically associated with said manifold carrier and configured to apply a clamping force between the input manifold, the meters under test, and the output port so that a fluid-tight flow-path is created between the fluid source, the meters under test, and said output port;
    a fluid flow generator in fluid communication with said fluid source and configured for generating fluid flow through said fluid-tight flow-path; and
    a controller electrically associated with said clamping force generator and said fluid flow generator and wherein said controller is configured to activate said clamping force generator to create and release said clamping force and wherein said controller is further configured to activate said fluid flow generator to create fluid flow at a predefined flow rate through said fluid-tight flow-path until a predefined volume has passed through said fluid-tight flow-path and into said measurement container.

2. The modular fluid meter test system as in claim 1, further comprising two top rails configured to enhance the structural integrity of the test system wherein each top rail defines a one-piece structure that further defines one of said support surfaces wherein each top rail runs the full length of said middle module and at least a part of the length of at least one of (a) said input module and (b) said output module.

3. The modular fluid meter test system as in claim 1, wherein:
    said input module comprises a left input panel mechanically removably associated with a right input panel by at least one cross member and releasable attachment elements wherein one end of each of said input panels defines at least one input module interface;
    said middle module comprises a left middle panel mechanically removably associated with a right middle panel by at least one cross member and releasable attachment elements wherein a first end of each of said middle panels defines a first middle-panel interface and the opposing second end of each of said middle panels defines a second middle-panel interface wherein each of said first middle-panel interfaces is mechanically associated with an input module interface thereby connecting the two modules; and
    said output module comprises a left output panel mechanically removably associated with a right output panel by at least one cross member and releasable attachment elements wherein a first output panel end for each output panel defines an output module interface and the opposing second output panel end for each output panel defines an output port interface wherein each output module interface is mechanically removably associated with a second-middle-panel-interface thereby connecting the middle module to the output module and wherein said output port interface is mechanically removably associated with said output port.

4. The modular fluid meter test system as in claim 3, wherein at least one of said input module, said middle module and said output module defines a double panel configuration to enhance the structural integrity of the test system.

5. The modular fluid meter test system as in claim 3, wherein said input module interface defines a female interface, said first middle-panel interface defines a male interface, said second middle-panel interface defines a female interface and said output module interface defines a male interface.

6. The modular fluid meter test system as in claim 5, wherein at least a portion of said input module, said middle module and said output module define a conduit element configured for receiving electrical wiring and wherein at least a portion of said input module interface, said first middle-panel interface, said second middle-panel interface, and said output module interface make up a section of said conduit element.

7. The modular fluid meter test system as in claim 5, wherein at least one of said left input panel, said right input panel, said left middle panel, said right middle panel, said left output panel and said right output panel define a plurality of cutout portions.

8. The modular fluid meter test system as in claim 7, wherein at least one of said input module interface, said first middle-panel interface, said second middle-panel interface, and said output module interface further comprises a splice plate wherein said splice plate is constructed, at least in part, from one of said plurality of cutout portions.

9. A modular fluid meter test system configured for testing the accuracy of fluid flow meters, said modular fluid meter test system comprising:
a first input module mechanically releasably associated with a first output module and wherein at least one of said first input module and said first output module define a pair of parallel support surfaces mechanically associated with a plurality of meter supports wherein each meter support is configured to support a meter under test and wherein said first input module and said first output module each define at least one leveling element;
an input manifold carrier assembly mechanically and movably associated with said first input module wherein said input manifold carrier assembly is mechanically associated with an input manifold in fluid communication with a fluid source;
an output port that is one of (a) mechanically associated with said first output module and (b) defined by said first output module and wherein said output port is in fluid communication with a measurement container associated with an electronic scale;
a clamping force generator mechanically associated with said manifold carrier and configured to apply a clamping force between the input manifold carrier, the meters under test, and the output port so that a fluid-tight flow-path is created between the fluid source, the meters under test, and said output port;
a fluid flow generator in fluid communication with said fluid source and configured for generating fluid flow through said fluid-tight flow-path; and
a controller electrically associated with said clamping force generator and said fluid flow generator and wherein said controller is configured to activate said clamping force generator to create and release said clamping force and wherein said controller is further configured to activate said fluid flow generator to create fluid flow at a predefined flow rate through said fluid-tight flow-path until a predefined volume has passed through said fluid-tight flow-path and into said measurement container and wherein said controller is electrically associated with said electronic scale.

10. The modular fluid meter test system as in claim 9, further comprising two top rails configured to enhance the structural integrity of the test system wherein each top rail defines a one-piece structure that further defines one of said support surfaces.

11. The modular fluid meter test system as in claim 9, further comprising a second input module and second output module and wherein said input manifold defines a plurality of manifold-outputs wherein said second input module is mechanically releasably associated with said second output module and wherein at least one of said second input module and said second output module define a pair of parallel support surfaces mechanically associated with a plurality of meter supports wherein each meter support is configured to support a meter under test and wherein the second input module and second output module each define at least one leveling element and wherein said second input module is in fluid communication with one of the manifold-outputs;
a second output port that is one of (a) mechanically associated with said second output module and (b) defined by said second output module and wherein said second output port is in fluid communication with said measurement container;
wherein said second input module is disposed adjacent to said first input module and said second output module is disposed adjacent to said second output port thereby creating a second-flow-path parallel to said fluid-tight flow-path; and
wherein said controller is configured to activate said clamping force generator and said fluid flow generator so that the second-flow-path is used one of (a) simultaneously with said fluid-tight flow-path and (b) independent of said fluid-tight flow-path.

12. The modular fluid meter test system as in claim 9, wherein:
said first input module comprises a left input panel mechanically removably associated with a right input panel by at least one cross member and releasable attachment elements wherein one end of each of said input panels defines at least one first input module interface; and
said first output module comprises a left output panel mechanically removably associated with a right output panel by at least one cross member and releasable attachment elements wherein a first output panel end for each output panel defines a first output module interface and the opposing second output panel end for each output panel defines an output port interface wherein each first output module interface is mechanically removably associated with an first input module interface thereby connecting the first input module with said first output module and wherein said output port interface is mechanically removably associated with said output port.

13. The modular fluid meter test system as in claim 12, wherein at least one of said first input module and said first output module defines a double panel configuration to enhance the structural integrity of the test system.

14. The modular fluid meter test system as in claim 12, wherein said first input module interface defines a female interface and said first output module interface defines a male interface.

15. The modular fluid meter test system as in claim 14, wherein at least a portion of said first input module and said first output module define a conduit element configured for receiving electrical wiring and wherein at least a portion of said first input module interface and said first output module interface make up a section of said conduit element.

16. The modular fluid meter test system as in claim 14, wherein at least one of said left input panel, said right input panel, said left output panel and said right output panel define a plurality of cutout portions.

17. The modular fluid meter test system as in claim 16, wherein at least one of said first input module interface and said first output module interface further comprises a splice plate wherein said splice plate is constructed, at least in part, from one of said plurality of cutout portions.

\* \* \* \* \*